Feb. 22, 1966    J. GAILLARD    3,236,278
WHEEL FOR PNEUMATIC TIRES
Filed Aug. 17, 1964
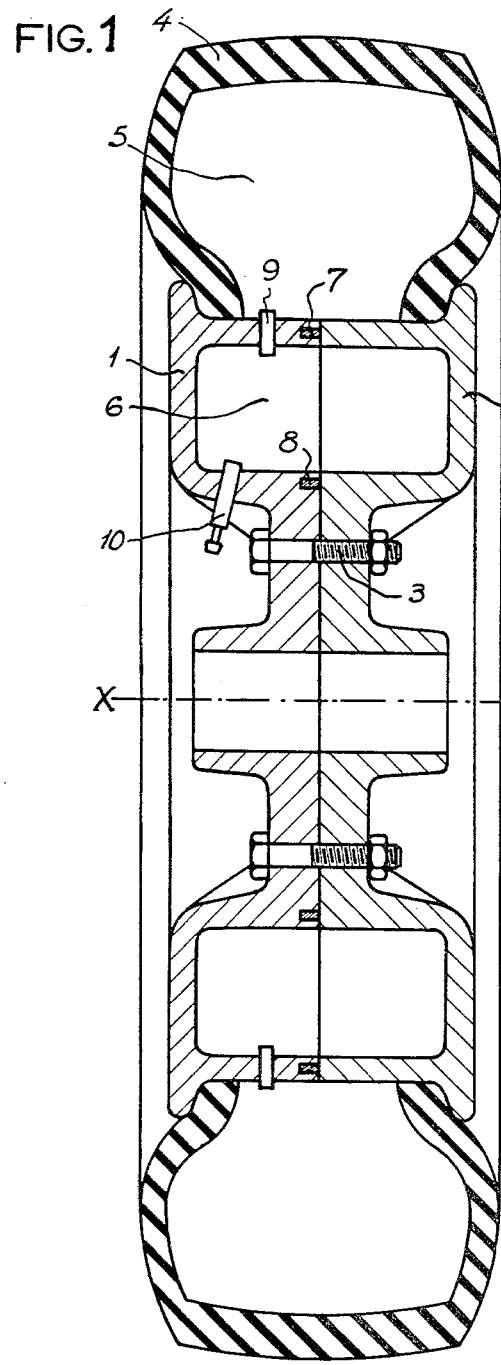
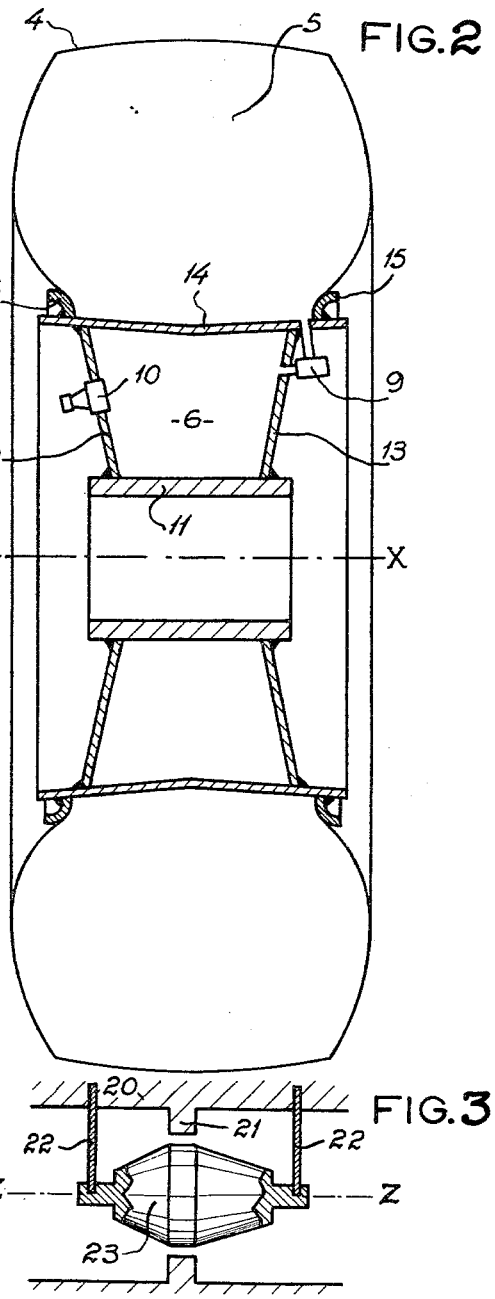
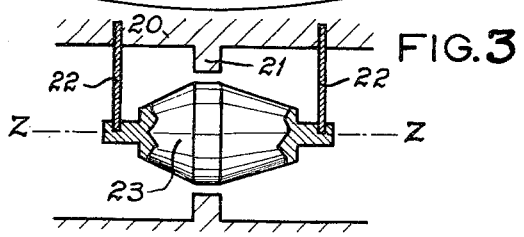

United States Patent Office 3,236,278
Patented Feb. 22, 1966

3,236,278
WHEEL FOR PNEUMATIC TIRES
Jean Gaillard, 51 Rue du Ranelagh, Paris 16, France
Filed Aug. 17, 1964, Ser. No. 390,055
Claims priority, application France, Sept. 6, 1963,
946,809, Patent 1,377,397
4 Claims. (Cl. 152—10)

The present invention relates to wheels fitted with pneumatic tires and in particular with tubeless tires for automobile vehicles.

It is known that pneumatic tires constitute in themselves a damped elastic suspension, and a secondary suspension with shock-absorbers is often added to them, between the wheel and the chassis or the body.

An aspect of the invention is to adapt the wheel so as to combine with it an additional damped suspension.

A further object of the invention is to adapt this supplementary damped suspension so as to render it automatically variable with the speed and/or with the acceleration or the deceleration of the wheel.

Another object of the invention is to reduce the size and even to eliminate the secondary suspension between the wheel and the chassis, its function being fulfilled, at least in part, by the new suspension.

In the wheel for a pneumatic tire according to the invention, on the one hand the wheel and the tire form between them a space filled with air under pressure, but on the other hand, the wheel further contains a second space filled with air under pressure and communicating with the first space only by restricted passages. These restricted passages may be for example, depending on questions of choice or opportunity, simple calibrated orifices, passages filled with material impeding the circulation of air, valve devices or devices with shutter and diaphragm. In this latter case, the shutter and the diaphragm are movable with respect to each other, for example as a function of the pressures on each side of the device, one or both of these members having a profile chosen in dependence of the desired mode of operation. These restricted passages have the effect that the two said spaces are at the same average pressure, but the rapid variations of pressure in the tire when the vehicle is running are not transmitted to the second space, leaving the pneumatic tire to work in its normal manner, whereas the slower variations are transmitted to the second space, which thus plays the part of a damped elastic suspension.

The invention further provides that the above-mentioned restricted passages may be made responsive, wholly or in part, to the speed and/or to the acceleration and/or to the deceleration of the wheel. For example, the shutter and diaphragm devices may be oriented in the wheel in such manner that the moving member moves along a radius, or alternatively tangentially to the wheel, which renders it responsive to the speed of the wheel or alternatively to its acceleration or deceleration. The invention thus provides an automatically variable suspension with one or more of the following factors: the suspension may automatically become stiffer at high speeds, for the purpose of improving road-holding properties; and/or the suspension may automatically become softer during starting or while braking, for the purpose of increasing the adhesion.

The invention will now be described with reference to the accompanying drawings, given by way of examples only and without any implied limitation. In these drawings:

FIG. 1 shows an axial section of a wheel of cast construction, and in two parts;

FIG. 2 represents an axial section of a wheel of welded sheet steel;

FIG. 3 represents an axial section of a detail, to a large scale, of a shutter and diaphragm device.

In FIG. 1, the wheel having an axis of rotation XX is constructed in two parts 1 and 2 generally symmetrical and assembled together by screws and nuts 3. The wheel receives a tubeless pneumatic tire 4 thus forming the usual space 5. According to the invention, the two parts 1 and 2 form between them a second space 6 of annular form, made air-tight by annular joints 7 and 8; the two spaces 5 and 6 communicate by one or more restricted passages 9. A conventional valve 10 enables the whole assembly to be put under pressure through the intermediary of the space 6 (as shown); it could also quite well supply the space 5 (arrangement not shown).

In FIG. 2, the wheel is constructed of welded sheet steel, and is constituted by a hub 11, two frusto-conical discs 12 and 13 and a rim 14 with beads 15. Also shown in FIG. 2 is the tire 4, the space 5 between the wheel and the tire, the space 6 formed in the wheel, the restricted passage or passages 9, and the valve 10. However, the restricted passage or passages 9 are in this case located externally of the wheel so as to be readily accessible.

It is clear that the wheel according to the invention, shown in cast two part construction as in FIG. 1, and in one-piece welded sheet steel construction in FIG. 2, may equally well be constructed by a one-piece casting or by welded sheet steel in two parts, or it may be constructed in a conventional manner with the addition of a chamber constituting the space 6 according to the invention. Furthermore, the two figures show a pneumatic tire without an inner tube; in the case of a pneumatic tire with an inner tube, the valve of the latter will be displaced, the conduit of this valve being connected to the restricted passage, as will be quite obvious to those skilled in the art.

FIG. 3 shows a device which is suitable as a restricted passage 9 of the wheel according to the invention. This device comprises a conduit 20, provided internally with an annular collar forming a diaphragm 21. This conduit 20 is provided with two leaf-springs 22 holding a valve-shutter 23, which can thus move elastically along the axis ZZ. In this movement, the profile (the central portion) of the valve-shutter 23 co-operates with the diaphragm 21 so as to permit the air to pass through a passage of variable section. By mounting this device on the wheel in such manner that its axis ZZ is parallel to the axis XX of the wheel, the displacement of the valve-shutter 23 is a function of the pressures in the spaces 5 and 6. By mounting it in a radial manner (the axis ZZ being a radius of the wheel), this displacement is also a function of the centrifugal force resulting from the rotation of the wheel, that is to say of the peripheral speed of the wheel. Finally, by mounting it in a manner in which the axis ZZ is perpendicular simultaneously to the axis XX and to the radius of the wheel, the displacement of the valve-shutter 23 is also a function of the accelerations and the decelerations of the wheel.

In all cases, the profile (the meridian line) of the valve-shutter, which can be chosen freely, makes it possible to obtain for the section of passage of the air between the shutter and the diaphragm, any desired mode of operation, symmetrical or asymmetrical as a function of the factors adopted; the said profile may be symmetrical or asymmetrical and the shutter may be provided with one or two fixed or elastic stops limiting its travel or braking its movement.

What I claim is:

1. A wheel with a pneumatic tire comprising, in addition to the air-space in the interior of the tire, a second air-space, and a passage permitting communication between said air-spaces, said passage being provided with means for retarding the circulation of air including a closure member and a diaphragm movable one with respect to the other.

2. A wheel as claimed in claim 1, in which said closure member and diaphragm are arranged such that relative displacement therebetween is parallel to the axis of said wheel.

3. A wheel as claimed in claim 1, in which said closure member and diaphragm are arranged such that relative displacement therebetween is parallel to a radius of said wheel.

4. A wheel as claimed in claim 1, in which said closure member and diaphragm are arranged such that relative displacement therebetween is perpendicular to the axis of said wheel and to a radius of said wheel.

References Cited by the Examiner
UNITED STATES PATENTS

| | | | |
|---|---|---|---|
| 2,024,040 | 12/1935 | Hollingsworth | 152—10 |
| 2,872,962 | 2/1959 | Laurent | 152—10 |

EUGENE G. BOTZ, *Primary Examiner.*

ARTHUR L. LA POINT, *Examiner.*

C. W. HAEFELE, *Assistant Examiner.*